United States Patent [19]

Bauer et al.

[11] Patent Number: 4,555,343

[45] Date of Patent: Nov. 26, 1985

[54] PROCESS OF LIQUID-LIQUID EXTRACTION OF METALS, WITH THE AID OF A MICROEMULSION, FROM AN AQUEOUS SOLUTION

[75] Inventors: Denise Bauer, Le Raincy; Jacques Komornicki, Lescar; Jacques Tellier, Billere, all of France

[73] Assignee: Societe Nationale Elf Aquitaine, France

[21] Appl. No.: 469,241

[22] Filed: Feb. 24, 1983

[30] Foreign Application Priority Data

Feb. 26, 1982 [FR] France ................................ 82 03231

[51] Int. Cl.$^4$ .............................................. B01D 11/04
[52] U.S. Cl. ................................................... 210/643
[58] Field of Search ....................... 210/638, 642, 643

[56] References Cited

U.S. PATENT DOCUMENTS

| | | | |
|---|---|---|---|
| 3,389,078 | 6/1968 | Elzinga et al. | 210/643 X |
| 3,696,028 | 10/1972 | Li et al. | 210/643 X |
| 3,779,907 | 12/1973 | Li et al. | 210/638 |
| 3,880,752 | 4/1975 | Premo | 210/600 |
| 4,283,290 | 8/1981 | Davies | 210/643 |
| 4,292,181 | 9/1981 | Li et al. | 210/643 X |

OTHER PUBLICATIONS

Friberg, Stig; "Microemulsions and their Potentials" Chemtech, 2/1976, pp. 124–127.

Primary Examiner—Richard V. Fisher
Assistant Examiner—W. Gary Jones
Attorney, Agent, or Firm—Ostrolenk, Faber, Gerb & Soffen

[57] ABSTRACT

Extraction of a metal compound from an aqueous solution by means of a hydrophobic liquid, with the production of a microemulsion; the aqueous solution has a pH of about 0.5 to 8; the surfactant employed for formation of the microemulsion is nonionic or anionic.

14 Claims, No Drawings

PROCESS OF LIQUID-LIQUID EXTRACTION OF METALS, WITH THE AID OF A MICROEMULSION, FROM AN AQUEOUS SOLUTION

The present invention relates to an improved process for the extraction of various metals from aqueous solutions of their compounds, by means of a microemulsion. It relates particularly to extraction with the aid of a liquid immiscible with water, containing a reactant capable of giving with the desired metal a compound soluble in the liquid in question.

Liquid-liquid extraction is known, in which an aqueous phase containing dissolved metal compounds is agitated with an organic phase immiscible with water, which contains a reactant capable of giving, with the metal in question, a compound soluble in the organic phase; this method is often used at the present time; it allows the desired metal to be recovered in the form of a salt soluble in water from the organic phase, which becomes enriched with this metal by agitation with the initial aqueous solution. This method applies to a large number of metals, particularly those of Groups II to VIII of the Periodic Classification of the Elements. The known technique generally consists in dissolving in the organic phase, usually constituted by hydrocarbon solvents, a reactant known as the "extractant" which is capable of forming a complex with the desired cation in the initial solution. The extractants most commonly used at present are organo-phosphorus derivatives, 8-hydroxy-quinoline, alpha or beta-hydroxy-oximes, aliphatic amines etc. Also, it is known to extract nickel, Fe, Ge, Al, U, Pt, Rh etc. from aqueous solutions of their salts, by means of kerosene in which bis(2-ethylhexyl) phosphate, bis(diisobutyl-methyl) dithiophosphate, 7-(3-nonyl-1-propenyl)-8-hydroxy-quinoline or 2-hydroxy-5-nonyl-acetophenone oxime has already been dissolved.

Although extractions by this technique can proceed with excellent yields, they nevertheless have the disadvantage of being slow, which is a defect from the industrial standpoint. In practice, extraction requires at least half an hour and more often it is necessary to maintain the two immiscible phases in intimate contact, by agitation, for several hours. As regards rapidity of extraction, considerable progress has been made by a method of operation in which a surfactant and a cosurfactant are added, which causes the organic phase separated to be constituted by a microemulsion. In these circumstances, passage of the desired metal into the organic phase is very rapid and the extraction only lasts some minutes or even some seconds. However, in the rare applications of this latter procedure up till now, there is a tendency to include impurities in the useful phase separated; this is because the microemulsion contains substantial proportions of the initial aqueous solution, where the impurities are found, as well as in the product of re-extraction.

The present invention results from the discovery that not only can the rapidity of extraction be considerably increased, but also the purity of the products obtained can be improved, if the microemulsion is produced in the presence of an aqueous phase of a pH in the range from about 0.5 to 8.

Also, according to another feature of the invention, the surfactants employed are anionic or preferably nonionic agents, that is compounds which produce the microemulsion, in the presence of a co-surfactant, in a weakly acid or neutral medium.

The improved process according to the invention, which consists in effecting extraction of a metal compound from an aqueous solution by means of a hydrophobic liquid so as to produce a microemulsion which replaces one of the two phases, is characterized in that the aqueous solution treated has a pH of about 0.5 to 8 and the surfactant employed is nonionic or anionic and active within this pH range.

The process of the invention can be carried out in two different ways: the microemulsion can be of the Winsor I type or of the Winsor II type, that is, the proportions of the surfactant and co-surfactant can be adjusted so that the microemulsion replaces the aqueous phase (W I) surmounted by the hydrophobic liquid into which the metal to be extracted has passed or the supernatant hydrophobic liquid (W II).

The first of these embodiments (W I) has the advantage of a facility for re-extraction of the desired metal, as it is sufficient to treat the supernatant liquid separated from the microemulsion. However, as the surfactant compound is found principally in the microemulsified aqueous phase, its recovery requires recycling of the aqueous phase or even resolution of the microemulsion, in order to obtain the surfactant and the hydrophobic liquid fraction containing the extractant.

The second embodiment (W II) has the advantage of involving practically no loss by the separated aqueous phase, but the supernatant microemulsion, the dispersant phase of which is the hydrophobic liquid, contains the initial aqueous solution with its impurities, which must be separated before effecting re-extraction of the metal from the hydrophobic liquid.

According to one of the features of the present invention, this separation can become unnecessary, because it is possible to reduce considerably the water content of the supernatant microemulsion (of W II) with respect to that common in the prior art. It is known for example that in the separation of Ga in alkaline medium (Compte Rendu de l'Acad. des Sc. Paris, vol. 292 (6 April 1981), Series II, page 1020), the water content of the organic phase is of the order of 65 to 140 g/l, whilst through the present invention this content can be reduced below 23 g/l.

As regards the nature of the hydrophobic liquids, termed "diluents" in this technique, they are as in known processes, namely principally hydrocarbons, optionally halogenated, for example dodecane, kerosene, benzene, solvent naphtha, chloroform, carbon tetrachloride etc. The same applies to the extractants already mentioned above, as well as to the co-surfactants. The latter are in the main $C_3$ to $C_{16}$ primary, secondary or tertiary alcohols with straight or branched chains, alkyl glycols having hydrocarbon chains containing 3 to 16 carbon atoms or possibly primary, secondary or tertiary amines; also suitable in a general manner are lipophilic compounds having a polar group.

The proportions of the nonionic or anionic surfactant and the co-surfactant depend upon their nature and on that of the diluent, as well as the components of the aqueous solution present; these proportions thus cannot be indicated a priori. It can be stated however, with a certain approximation, that the concentration of the most effective surfactants lies between 0.01 and 0.5 moles/l of diluent and preferably between 0.02 and 0.25 moles/l. As regards the proportions of alcohol, they generally are from 0.03 to 0.5 vol/volume of diluent and preferably from 0.05 to 0.4.

Whereas the Examples given below relate to the extraction of various particular metals, the improved process according to the invention applies as well to other metals, in the same way as the known methods of the prior art.

In the non-limitative examples which follow, the extractions are effected as follows.

A mole fraction of the extractant and an appropriate quantity of the surfactant are dissolved in 1 liter of kerosene and then a predetermined volume of alcohol is added. This kerosene solution is then mixed with 1 liter of the solution containing the metal salt to be extracted. Two phases are then rapidly obtained: the homogeneous and transparent upper phase is a microemulsion of water in the kerosene. The lower phase is constituted by the initial aqueous solution from which the desired metal has been extracted and is in the kerosene of the upper phase. The time of separation of the two phases is thus the time of extraction of the metal; it is noted and it is this which is given in the Examples as the extraction time in minutes.

EXAMPLES 1 TO 6

In this series of tests, the aqueous solution contains a Ge salt (IV) at a concentration of $10^{-2}M$ of the latter; it also contains sulphuric acid (0.1M), sodium sulphate (0.06M) and/or caustic soda in an appropriate quantity to obtain the pH indicated in the first horizontal line of the Table given below. The kerosene contains 0.2 mole of 7-(3-nonyl-1-propenyl)-8 hydroxy-quinoline (commercial name "Kelex 100"), 50 g namely 5% of a surfactant, the nature of which is indicated in the results Table, as well as a certain volume of butanol or pentanol indicated in the Table on page 9.

After rapid mixing of the kerosene containing the additives indicated with the aqueous Ge solution to be extracted, the two phases formed are allowed to separate, the time to the end of this operation being noted. The volumes of each of these phases are noted and the percentages of the initial quantities of Ge, extractant, surfactant, alcohol and water found in each of the two phases are determined.

Then, 5% of NaOH is added to the microemulsion, which causes complete resolution of the microemulsion into a kerosene layer and an aqueous layer; the latter then contains all the Ge which has been complexed in the kerosene by the extractant; the initial Ge is thus recovered, separated from the major part of the substances which accompanied it in the initial aqueous solution.

These tests show that, at a pH below 8, the percentage of metal extracted is much higher than for pH 12.5. On the other hand, with a pH in the range from 0.5 to 7 (Examples 1 and 2) in the presence of a nonionic or anionic surfactant, the proportion of the initial aqueous solution found in the microemulsion can be considerably reduced, as shown by a much better purity of the Ge solution obtained by re-extraction.

As regards the extraction speeds, they are 3 to 120 times more rapid than in similar standard extractions effected without a surfactant (last two horizontal lines of the Table).

EXAMPLE 7

In this Example, 1 liter of kerosene containing 0.25 mole of bis(2-ethyl-hexyl)-dithiophosphate is agitated with 1 liter of a solution of $10^{-2}M$ $NiSO_4$ and 0.2M $H_2SO_4$. 80 g of surfactant constituted by the decyl ether of glucose (Triton BG 10) and 20 ml of n-hexanol is added. After separation into two layers, the upper layer is constituted by a microemulsion. These are the results of this test.

| | |
|---|---|
| pH | 0.6 |
| Volume of aqueous phase per 100 volumes of microemulsion obtained | 97 |
| % of initial surfactant found in the microemulsion | 100 |
| % of initial Ni found in the microemulsion | 100 |
| % of initial extractant in the microemulsion | 100 |
| % of initial hexanol in the microemulsion | 99 |
| grams of aqueous solution in 1 liter of microemulsion | 30 |
| Time of extraction in mins | 0.5 |
| Time of similar extraction without surfactant in mins | 10 |

EXAMPLE 8

Extraction of Al : Winsor I type microemulsion

The aqueous solution to be treated contains $5 \times 10^{-3}M$ $Al_2(SO_4)_3$ and 0.1M $H_2SO_4$. Its pH is 1.

1 liter is mixed with 1 liter of kerosene in which has been dissolved 0.2 mole of di-(ethyl-hexyl) phosphate as the extractant.

50 g of Na lauryl-sulphate and 75 ml of n-pentanol are added to the mixture and it is briefly agitated. After separation, the system comprises two distinct layers; above is the major part of the initial kerosene and below a transparent microemulsion of kerosene in water. This is thus a two-phase system comprising an organic phase and an aqueous microemulsion phase, namely the Winsor I type.

Examination of each of the layers obtained leads to the following results:

| | Organic layer (upper) | Aqueous microemulsion (lower) |
|---|---|---|
| Volumes in ml | 920 | 1200 |
| Al % of total initial Al | 90.3 | 9.7 |
| % of initial lauryl-sulphate | 0 | 100 |
| % of extractant utilized | 90 | 10 |
| % of n-pentanol utilized | 66 | 34 |
| % of kerosene utilized | 90 | 10 |

It can be seen that the major part of the Al is found in the organic phase, from which this cation is easily recovered by standard re-extraction. The tenth part approximately which remains in the aqueous microemulsion is not lost, because the latter is re-used for dissolution of a new quantity of aluminium sulphate. This re-use also means that in a new extraction it is not necessary to add fresh Na lauryl sulphate.

TABLE

| EXAMPLES No: | 1 | 2 | 3 | 4 | 5 | 6 |
|---|---|---|---|---|---|---|
| pH of aqueous solution | 1 | 1 | 1 | 4 | 7 | 12.5 |
| Vol of alcohol utilised in % of kerosene: | | | | | | |
| n-butanol | — | — | — | 35 | 40 | 40 |
| n-pentanol | 28 | 20 | 20 | — | — | — |

TABLE-continued

| EXAMPLES No: | 1 | 2 | 3 | 4 | 5 | 6 |
|---|---|---|---|---|---|---|
| Vol. of aqueous phase per 100 vol. of microemulsion obtained | 97 | 98 | 96 | 95 | 95 | 95 |
| % of initial surfactant found in the microemulsion: | | | | | | |
| Na dodecyl-benzene-sulphate: | — | — | — | 99.3 | 99 | 99 |
| Heptaethoxylated nonylphenol | 100 | — | — | — | — | — |
| Na lauryl-sulphate | — | 100 | — | — | — | — |
| Decyl-ether of glucose (Triton BG 10) | — | — | 100 | — | — | — |
| % initial Ge in the microemulsion at equilibrium: | 99.6 | 99.6 | 99.5 | 99.5 | 99.5 | 3 |
| % of initial extractant in the microemulsion at equilibrium | 100 | 100 | 100 | 100 | 100 | 100 |
| % of the initial alcohol in the microemulsion | 99 | 99 | 99 | 90 | 90 | 90 |
| % of the initial aqueous solution in the microemulsion | 2.3 | 2.0 | 4.0 | 6.6 | 5.5 | 5.5 |
| g of aqueous solution in 1 liter of microemulsion: | 23 | 20 | 40 | 66 | 55 | 55 |
| Time of extraction in mins: | 10 | 10 | 2 | 2 | 2 | 2 |
| Time of similar extraction without surfactant in mins | 30 | 30 | 30 | 240 | 240 | ∞ |

We claim:

1. A process for the extraction of metal ions from an aqueous solution thereof which comprises:
    mixing (a) an aqueous solution containing the metal ions and having a pH of 0.5 to 8, (b) a hydrophobic liquid containing an extractant for the metal ions, (c) an anionic or nonionic surfactant and (d) an alcohol co-surfactant, in a proportion such that the hydrophobic liquid forms a microemulsion with a portion of the aqueous solution;
    allowing the mixture to separate into an aqueous layer and a microemulsion layer;
    separating the aqueous layer from the microemulsion layer;
    breaking the microemulsion; and
    recovering the aqueous phase of the broken microemulsion.

2. The process according to claim 1 in which the surfactant is an anionic surfactant and the alcohol co-surfactant has 3 to 16 carbon atoms.

3. The process according to claim 1 in which the surfactant is a nonionic surfactant and the alcohol co-surfactant has 3 to 16 carbon atoms.

4. The process according to claim 1 in which the hydrophobic liquid is kerosene.

5. The process according to claim 1 in which the hydrophobic liquid is selected from the group consisting of dodecane, benzene, naphtha, chloroform, and carbon tetrachloride.

6. The process according to claim 1 in which the amount of surfactant is 0.01 to 0.5 mole per liter of the hydrophobic liquid and the amount of alcohol co-surfactant is 0.03 to 0.5 volume per volume of hydrophobic liquid.

7. The process according to claim 6 in which the amount of surfactant is 0.02 to 0.25 moles per liter of the hydrophobic liquid and the amount of alcohol co-surfactant is 0.05 to 0.4 volume per volume of hydrophobic liquid.

8. The process according to claim 1 in which the extractant is selected from the group consisting of bis(2-ethyl-hexyl)dithiophosphate, di-(ethyl-hexyl) phosphate, bis(diisobutyl-methyl) dithiophosphate, 7-(3-nonyl-1-propenyl)-8-hydroxy-quinoline and 2-hydroxy-5-nonyl-acetophenone oxime.

9. The process according to claim 1 in which the surfactant is selected from the group consisting of sodium dodecyl benzene sulfate, sodium lauryl sulfate, heptaethoxylated nonyl phenol and decyl ether of glucose.

10. The process according to claim 9 in which the metal ions are selected from the group consisting of Ni, Fe, Ge, V, Pt and Rh.

11. The process according to claim 10 in which the surfactant is selected from the group consisting of sodium dodecyl benzene sulfate, sodium lauryl sulfate, heptaethoxylated nonyl phenol and decyl ether of glucose and which the amount of surfactant is 0.01 to 0.5 moles per liter of the hydrophobic liquid and the amount of alcohol co-surfactant is 0.03 to 0.5 volume per volume of hydrophobic liquid.

12. The process according to claim 11 in which the amount of surfactant is 0.02 to 0.25 mole per liter of the hydrophobic liquid and the amount of alcohol co-surfactant is 0.05 to 0.4 volume per volume of hydrophobic liquid, the extractant is selected from the group consisting of bis(2-ethyl-hexyl) phosphate, bis(diisobutylmethyl)dithiophosphate, 7-(3-nonyl-1-propenyl)-8-hydroxylquinoline and 2-hydroxy-5-nonyl-acetophenone and in which the hydrophobic liquid is selected from the group consisting of kerosene, dodecane, benzene, naphtha, chloroform, and carbon tetrachloride.

13. The process according to claim 12 in which the alcohol co-surfactant is butanol or pentanol.

14. The process according to claim 12 in which the alcohol co-surfactant is an alkyl glycol having 3 to 16 carbon atoms.

* * * * *